United States Patent Office 2,999,579
Patented Sept. 12, 1961

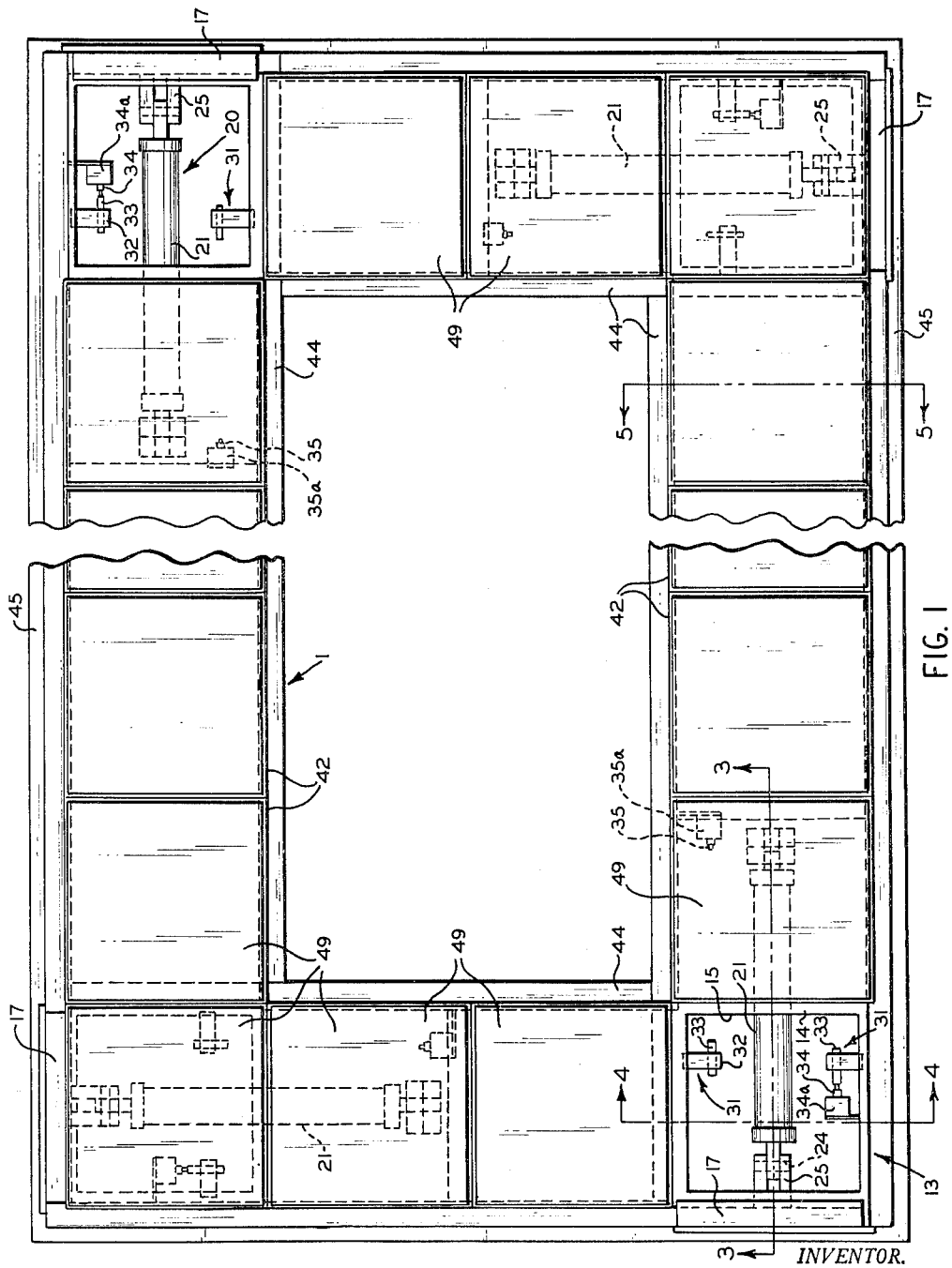

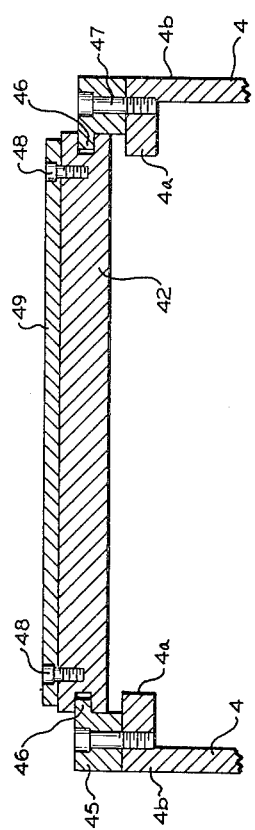
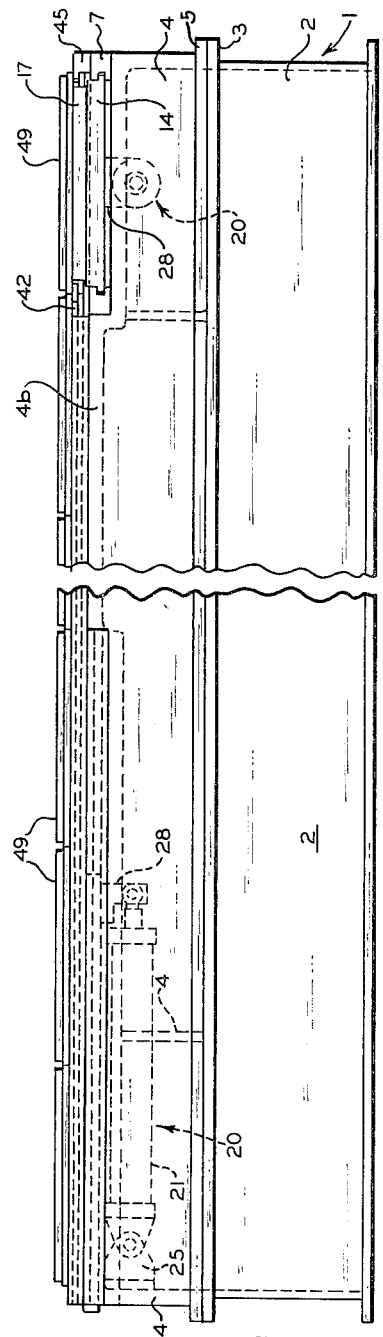

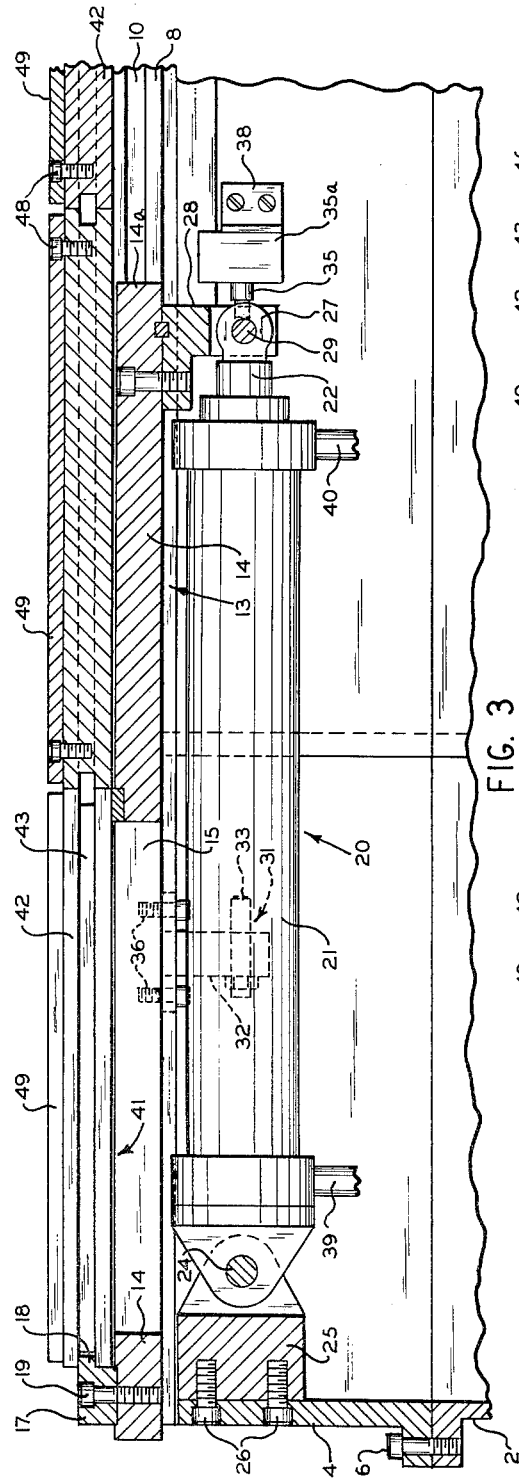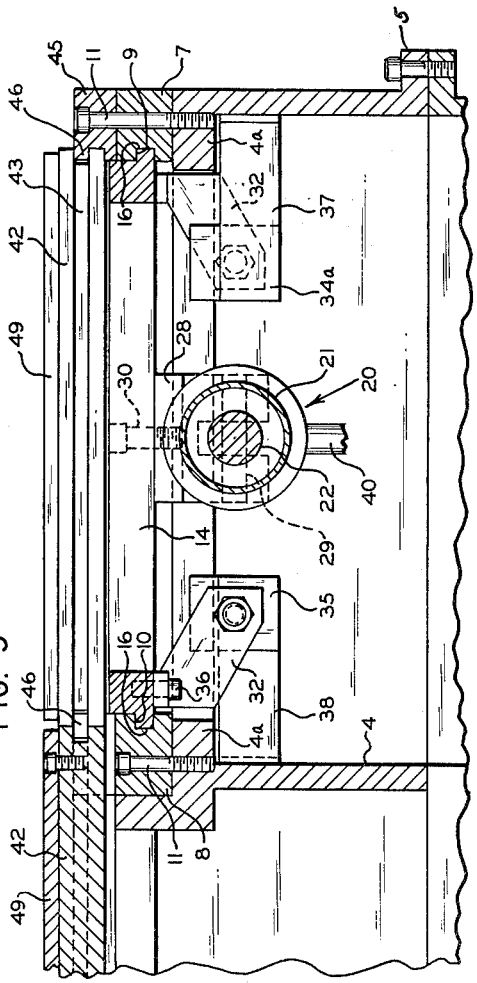

2,999,579
TRANSFER APPARATUS
Valerian R. Kostrzewa, 400 W. Lynn, Saginaw, Mich.
Filed Oct. 30, 1957, Ser. No. 693,477
3 Claims. (Cl. 198—19)

This invention relates to automatic transfer apparatus of the kind adapted to support and effect movement of a workpiece from one machining station through a series of other machining stations, or, alternatively, to support and effect movement of machine tools through a cycle of operations on stationary workpieces.

The majority of automatic transfer devices in current use seem to be machines of special character, that is, adapted for use in connection with a particular product. Such machines are expensive not only from the manufacturing standpoint, but also from the standpoint of converting the machine to enable it to handle products having even minor variations from the product it originally was built to handle. Special machines of this kind frequently are too costly for manufacturers of parts and devices of fairly frequent design changes, even though their use would enable material per unit savings to be effected once the machine is constructed or modified to handle units of uniform design.

With the advent of automated equipment, the problems of transfer of workpieces or tools from station to station have become more complicated since the most efficient use of such equipment depends on the orderly flow of parts or tools throughout the production or assembly cycle. One of the most pressing problems is to establish and maintain precision indexing of the articles being moved. Precise location of a workpiece or a tool is mandatory where automatic equipment is in use. Another problem is the provision of adequate space around the article being worked upon for the accommodation of personnel and/or machinery. At the same time, however, as much floor space as possible must be conserved in order that sufficient space may be available for other operations, cleaning, and maintenance.

An object of this invention is to provide transfer apparatus including workpiece or tool supporting pallets on which workpieces or tools of various different kinds may be mounted for movement from station to station.

Another object of the invention is to provide transfer apparatus of the kind referred to for use in conjunction with automatic machinery and which includes pallet indexing means operable to advance successive pallets from station to station throughout a complete cycle of machinery or assembling operations.

A further object of the invention is to provide pallet indexing means for transfer apparatus of the kind described which is operable to advance and position the pallets with extreme accuracy.

Still a further object of the invention is to provide transfer apparatus capable of providing a large number of work stations in a minimum of floor space.

Another object of the invention is to provide multiple station transfer apparatus utilizing minimum floor space and being so arranged as to provide ample room for personnel, machinery, and traffic.

Other objects and advantages of the invention will be pointed out specifically or will become apparent from the following description when it is considered in conjunction with the appended claims and the accompanying drawings, in which:

FIGURE 1 is a fragmentary, top plan view of transfer apparatus constructed and arranged in accordance with the invention;

FIGURE 2 is a fragmentary, side elevation of the structure shown in FIGURE 1;

FIGURE 3 is an enlarged sectional view taken on the line 3—3 of FIGURE 1;

FIGURE 4 is an enlarged sectional view taken on the line 4—4 of FIGURE 1; and

FIGURE 5 is an enlarged sectional view taken on the line 5—5 of FIGURE 1.

Apparatus constructed in accordance with the disclosed embodiment of the invention includes a main frame 1 composed of spaced pairs of supports 2 arranged in rectangular form to provide a closed quadrangular path. The upper edges of the supports may be flanged as at 3 to receive upstanding sub-support members 4, the latter also being arranged in spaced apart, rectangular form and being flanged at their lower edges as at 5. The support members 2 and 4 may be fastened one to another by suitable means such as bolts 6 (see FIGURES 3 and 4).

Each of the sections 4 may be inwardly flanged as at 4a and seated atop each of the outer support members 4 at the corners of the frame is a gibbed rail 7. A similar rail 8 is seated atop each of the inner supports 4, the grooves 9 and 10 of the rails 7 and 8, respectively, facing one another so as to form a track which is relatively short as compared to the length of any one side of the frame. Anchoring means of any suitable kind may be used to mount the rails 7 and 8, and conveniently may comprise bolts 11.

At each of the four corners of the rectangular path defined by the frame members is reciprocatable transfer means 13 comprising a rectangular element 14, a portion of which may be open as is shown at 15 in FIGURE 1, the side edges of the element 14 having laterally projecting tongues 16 which are received in the grooves 9 and 10 of the rails so as to guide the part 14 in its movements. Referring to FIGURE 3, the right-hand end 14a of the member 14 may be considered the leading end, whereas the left-hand end may be considered the trailing end. As is shown in FIGURES 1 and 3, the trailing end of the member 14 mounts a relatively short strip or rail section 17 which is equipped with a forwardly extending lip 18 for a purpose presently to be explained. Bolts 19, one of which is shown in FIGURE 3, secure the rail strip 17 to the member 14 for movement with the latter.

Means for imparting reciprocating movements to the several transfer devices 13 is provided and in each instance comprises a fluid pressure device 20 of known construction including a cylinder 21 in which is slidably mounted a piston (not shown) connected to a piston rod 22. The rear end of each cylinder may be equipped with a fitting 23 connected by a pin 24 to a bracket 25 mounted by means of bolts 26 on a support 4. The outer end of the piston rod 22 may be provided with a fitting 27 to which is connected the member 14 by means of a flanged lug 28 and a pin 29, the flanged lug being secured to the member 14 by means of bolts 30.

On each of the transfer elements 14 is mounted a pair of limit switch actuators 31, each of which comprises a bracket 32 in which is adjustably mounted a screw 33. One of the screws is arranged to project rearwardly for engagement with the contact arm 34 of a switch 34a mounted on the outer support 4 and the other screw 33 is arranged to project forwardly for engagement with the contact arm 35 of a similar switch 35a. The actuators 31 are secured to the member 14 by means of bolts 36 (see FIGURES 3 and 4), whereas the switches 34a, 35a are mounted on arms 37, 38, respectively, secured to and projecting from the supports 4 so as to lie in the path of the actuators 31.

The construction and arrangement of the parts thus far described are such that the closing of a starting switch (not shown) by manually or automatically operated means causes pressure fluid to enter the cylinder 21 through a hose or the like 39 to effect displacement of the piston and the piston rod 22 to the right, as viewed in FIGURE 3. The movement of the piston rod will be transmitted via the lug 28 to the transfer member 14 so as also to effect movement of the latter and the strip 17 to the right. The movement of the parts will continue until such time as the screw 33 of the switch actuator 31 engages the switch arm 35, whereupon a valve (not shown) of a known kind will be operated to reverse the flow of pressure fluid to the cylinder so that pressure fluid will be supplied to the cylinder 21 through a hose 40 to reverse the movement of the piston-driver parts. Upon reengagement of the screw 33 with the switch arm 34, the motion of the parts ceases until the starting switch again is actuated. The parts of the driving means are well known, and the circuitry for effecting operation of the apparatus may be such that each of the four drivers is operated sequentially or, alternatively, diagonally opposed pairs of drivers may be operated in unison. In either event, the circuitry is conventional in design and does not require further illustration.

Referring principally to FIGURES 3, 4 and 5, a plurality of pallet carriers 41 is mounted for movement along the closed path defined by the supporting members. Each of the pallet carriers comprises a square block 42 of metal having a continuous channel 43 formed in its side edges adapted to cooperate with guide rails 44 and 45 located at the outer and inner sides, respectively, of the closed path, each of the guide rails having a laterally projecting tongue 46 thereon adapted to be received in the channel 43 of the pallet carriers. As is best shown in FIGURES 3 and 4, the guide rails 44 and 45, at the corners of the apparatus, are mounted atop the rails 8 and 7, respectively, and secured thereto by the same bolts that secure the latter rails, but between the corners of the path the supporting members 4 are extended upwardly as is shown at 4b in FIGURES 2 and 5 so as to provide direct support for the guide rails 44 and 45. Bolts 47 may be used to fasten the guide rails to the flanges 4a as is shown in FIGURES 1, 3 and 4.

Suitably secured to each of the pallet carriers 41 by means of bolts 48 or the like is a pallet 49 and on which a workpiece (not shown) or a tool (not shown) may be mounted in any convenient manner for movement with the pallet and its carrier.

To condition the apparatus for operation, a plurality of pallets 49 and their associated carriers 42 are arranged on the quadrangular path defined by the supporting frame members and the guide rails. The number and arrangement of the several pallets should be such that there are fewer pallets than can be accommodated on the path and, preferably, there should be two fewer pallets so as to provide spaces at diagonally opposed corners of the path as is shown in FIGURE 1. As is shown in FIGURES 1, 3 and 4, each pallet carrier except those bordering the spaces is in engagement with two other carriers. It is preferred that the carriers be engaged rather than the pallets themselves, since it is possible that the pallets may be utilized apart from the remainder of the apparatus and thereby become damaged to some extent around the edges. With the pallet carriers thus arranged, movement imparted to any of them, except those bordering the spaces, in a given pathside, will be transmitted to the remainder in that pathside because of this engagement with one another.

When the pallets are arranged as is shown in FIGURE 1, the pressure fluid operating device 20 at the lower right hand corner of FIGURE 1, for example, may be actuated to effect movement of the transfer device 14 in a direction towards the upper right hand corner of FIGURE 1. The movement of the transfer device 14 will be transmitted by the rail strip 17 to the endmost pallet to move the latter in the direction of movement of the operating means 20 and, since the pallets or their carriers at one side of the path are in engagement with one another, all of the pallets in that particular side of the path will be moved in a direction to fill the space at the corner of the path. During the movement of the pallets along one side of the path, the rail strip 17 at the corner towards which the pallets are moving serves as a guide to prevent skewing of the leading pallet. Thus, the guide rails 17 not only serve to transmit motion to the pallets, but also function as guides during movement of the pallets. When the pallets along a particular side of the path have been moved a distance equal to the length of one pallet, the direction of motion of the transfer device 14 will be reversed due to the engagement of the switch actuator 31 with the switch 35a in a known manner. Because no pallet may be moved more than its own length, the indexing of the pallets is extremely accurate.

In those instances where there are two spaces provided along the path, such as is shown in FIGURE 1, movement of the pallets along one side of the path may be accompanied by movement of the pallets along the opposed portion of the path. Thus, in the disclosed embodiment of the invention movement of the pallets at the right hand end of FIGURE 1 may be accompanied by movement of the pallets in the left hand end of FIGURE 1. In those instances where only one space is provided along the path, however, movement of the pallets along any side of the path cannot be effected until the pallets have been moved along the immediately preceding side of the path.

Transfer apparatus constructed in accordance with the invention may utilize its pallets to support a workpiece for movement from station to station so as to be operated upon by a tool or a person located at each of the stations. Alternatively, each of the pallets may be used to support a tool for movement from station to station at which workpieces are located. Transfer apparatus of the kind disclosed may be made in a large number of different sizes and can be formed of sections so as to permit the size of the path to be traversed by the pallet numbers to be increased or decreased at will. Moreover, tools or workpieces may be supported on the frame members 4, 4a and either inwardly or outwardly of the rectangle bounded by the path. Thus, there is ample room for the machining or assembling operations to be performed. The rectangular form of the apparatus enables the greatest number of stations to be provided in the least amount of floorspace and permits straight aisles to be maintained for traffic. Because the tools and/or workpieces are supported on pallets, the transfer apparatus per se need not be modified to enable it to operate on products of widely varying scope. Thus, the apparatus may become a permanent part of a plant's equipment.

I claim:

1. Precision indexing article transfer apparatus for precisely locating work relative to work stations comprising; frame means forming a corner; a plurality of rectangular pallet members in edge-to-edge abutting relation, each having a free upper face to receive an article to be transferred around the corner; first, spaced apart, parallel, inner and outer guide rails mounted by said frame means and forming one section of said corner; second, spaced apart, parallel, inner and outer guide rails supported by said frame means and forming the other section of said corner, including an inner rail extending normally from said inner guide rail and an outer guide rail having an end aligning with the said other outer guide rail; a carriage at said corner mounted for longitudinal movement in longitudinal alignment with said second guide rails; a reciprocable assembly extending longitudinally with said second guide rails beneath said carriage and supported at one end by the interior of said frame means and at the other end connected to said carriage for moving said carriage to and fro longitudinally; an upstanding pusher rail fixed to the one end of said carriage forming, when the reciprocable assembly is in one position, a continuation of said outer rail of the first guide rails; parallel inner and outer, third guide rails beneath said second guide rails supported in longitudinal alignment therewith by said frame means; tongue and groove means on said third guide rails and carriage extending exactly longitudinally with said second guide rails; tongue and groove means on said first and second guide rails and pallets for maintaining, in cooperation with said tongue and groove means on said carriage and third guide rails, exact alignment of said pallets in their transfer from one section of said corner to another; and means for moving said pallets along said first guide rails with said tongue and groove means of the first guide rails and pallets in close interfitting relation to move a single pallet at a time onto said carriage and interfit the tongue and groove means of said second rails and pallet.

2. Article transfer apparatus comprising; frame means arranged to form a quadrangular path with corners; a plurality of rectangular pallet members mounted thereon in edge-to-edge abutting relation, each having a free upper face to receive an article to be transferred around the path; there being fewer pallet members on said path than can be accommodated thereon so as to provide at least one unoccupied space on said path equal to the size of a pallet member; said path including four corners; spaced apart, parallel, first, inner and outer guide rails mounted by said frame means and forming one section of each corner; spaced apart, parallel, second, inner and outer guide rails supported by said frame means and forming the other section of each corner, including an inner rail extending normally from said inner guide rail and an outer guide rail having an end aligning with the said other outer guide rail; a carriage at each corner mounted for longitudinal movement in longitudinal alignment with said second guide rails at each corner; a reciprocable assembly extending longitudinally with said second guide rails at each corner beneath each carriage and supported at one end by the interior of said frame means and at the other end connected to the carriage at each corner for moving said carriage to and fro longitudinally; an upstanding pusher rail fixed to the one end end of each carriage forming, when the reciprocable assembly at each corner is in one position, a continuation of said outer rail of the first guide rails at each corner; parallel inner and outer, third guide rails beneath said second guide rails at each corner supported in longitudinal alignment therewith by said frame means; tongue and groove means on said third guide rails and carriage at each corner extending exactly longitudinally with said second guide rails at each corner; tongue and groove means on said first and second guide rails and pallets for maintaining, in cooperation with said tongue and groove means on said carriages and third guide rails, exact alignment of said pallets in their transfer from one section of each corner to another; and means for moving said pallets along said first guide rails at each corner with said tongue and groove means of the first guide rails at the corner and pallets in close interfitting relation to move a single pallet at a time onto said carriage and interfit the tongue and groove means of said second rails and pallet.

3. Precision indexing article transfer apparatus for precisely locating work relative to work stations comprising; frame means forming a corner; a plurality of rectangular pallet members in edge-to-edge abutting relation, each having a free surface between its edges to receive an article to be transferred around the corner; first, spaced apart, parallel, inner and outer guide rail sections mounted by said frame means and forming one section of said corner; second, spaced apart, parallel, inner and outer guide rail means supported by said frame means and forming the other section of said corner, including an inner rail section extending normally from said first inner guide rail section and an outer guide rail section having an end aligning with the said first outer guide rail section; a carriage at said corner mounted for longitudinal movement in longitudinal alignment with said second guide rail sections; motion transmitting means connected to said carriage for moving said carriage to and fro longitudinally; an upstanding pusher rail fixed to the one end of said carriage forming, when the carriage is in one position, a continuation of said outer rail section of the first guide rail sections; parallel inner and outer, third guide rail sections beneath said second guide rail sections supported in longitudinal alignment therewith by said frame means; tongue and groove means on said third guide rail sections and carriage extending exactly longitudinally with said second guide rail sections; tongue and groove means on said first and second guide rail sections and pallets for maintaining, in cooperation with said tongue and groove means on said carriage and third guide rail sections, exact alignment of said pallets in their transfer from one section of said corner to another; and means for moving said pallets along said first guide rail sections with said tongue and groove means of the first guide rail sections and pallets in close interfitting relation to move a single pallet at a time onto said carriage and interfit the tongue and groove means of said second rail sections and pallet.

References Cited in the file of this patent

UNITED STATES PATENTS

| | | |
|---|---|---|
| 1,738,039 | Cope et al. | Dec. 3, 1929 |
| 2,392,169 | Mansfield | Jan. 1, 1946 |